UNITED STATES PATENT OFFICE.

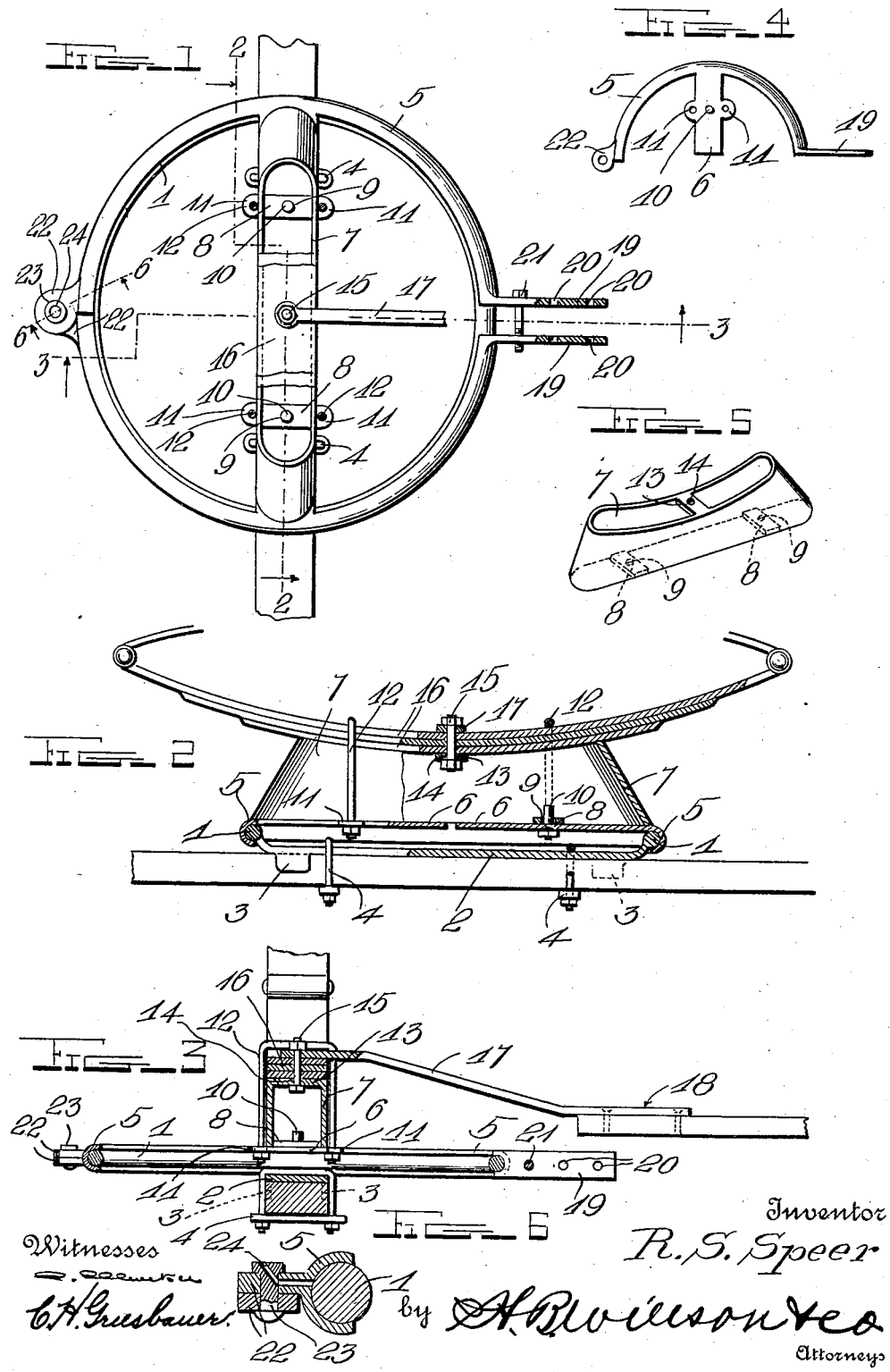

ROBERT S. SPEER, OF SEDGWICK, KANSAS.

FIFTH-WHEEL.

969,668.     Specification of Letters Patent.     Patented Sept. 6, 1910.

Application filed February 15, 1910. Serial No. 543,936.

*To all whom it may concern:*

Be it known that I, ROBERT S. SPEER, a citizen of the United States, residing at Sedgwick, in the county of Harvey and State of Kansas, have invented certain new and useful Improvements in Fifth-Wheels; and I do declare the following to be a full, clear, and exact description of the invention, such as will enable others skilled in the art to which it appertains to make and use the same.

This invention relates to improvements in fifth wheels for vehicles and has for its objects, first, to provide a fifth wheel wherein the employment of a king bolt is unnecessary, second, a fifth wheel that may be made considerably cheaper and with greater ease than most of the other types of such devices now in use, third, to provide a fifth wheel that is very durable and which will be incapable of laterally sliding or slipping as is now not infrequently the case, and fourth, a fifth wheel in which it is difficult, if not impossible, for any dirt or other foreign matter to collect between the several sections of the wheel.

With the foregoing and other objects in view, the invention consists in certain novel features of construction, combination and arrangement of parts, as will be more fully described and particularly pointed out in the appended claims.

In the accompanying drawings, Figure 1 is a plan view of a fifth wheel embodying my improvements, as applied. Fig. 2 is a central transverse section thereof, taken on the line 2—2 of Fig. 1. Fig. 3 is a central longitudinal section on the line 3—3 of Fig. 1. Fig. 4 is a detail elevation of one of the wheel sections. Fig. 5 is a detail perspective view of the spring block, and Fig. 6 is a detail sectional view on the line 6—6 of Fig. 1.

Referring to the drawings for a more particular description of the invention, the fifth wheel comprises the bottom section consisting of the circular ring 1 and the flat axle-engaging bar 2, which extends diametrically across the ring, is connected thereto at its opposite ends and is provided at each end and on its bottom with a pair of depending transversely alined lugs or ears 3, which engage opposite sides of the axle. The bar 2 is held in removable position on the axle by the usual clips 4, as shown. The top section of the fifth wheel comprises a pair of semicircular sections 5, which are pivoted together at their front ends and are of a suitable form in cross section to freely receive the ring 1 of the bottom section. The sections 5 of the top sections are provided with flat supporting extensions 6, which aline or register with each other.

The numeral 7 indicates what is commonly known as the spring block which is of approximately rectangular hollow form and is arranged in position with its bottom edges resting on the extension bars 6 of the sections 5. As shown, the spring block 7 is provided at its bottom and inner opposite ends with the transverse pieces 8, which are provided with central apertures 9 to receive pins 10, arising from the extension bars whereby the spring block is securely held against any turning movement or lateral displacement. The extension bars are provided at opposite edges with the apertured lugs 11, which receive the ends of clips 12, whereby the spring block is securely connected with the top section of the fifth wheel. The spring block is provided at its top with a central cross piece 13, which is apertured centrally, as at 14, to receive the bolt 15 which passes upwardly through the cross bar and through the bottom of the usual axle spring 16, whereby the spring block and spring are securely connected together. A brace bar 17 is connected at its front end with the bolt 15 and is provided at its rear end with the flattened portion 18, which is secured to the reach pole in the usual manner. The two sections 5 of the top member of the fifth wheel are provided with the rearwardly extending radial portions 19, which are provided with longitudinal series of apertures 20, to receive a connecting bolt 21, whereby the sections 5 are held in clamping engagement with the ring 1 of the bottom section. The top sections 5 are provided at their front ends with the offset portions 22, which are pivotally connected together by the rivet 23, which is hollowed out to provide an oil duct 24, whereby oil may be supplied to the top sections 5.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

What is claimed as new is:—

1. A fifth wheel for vehicles, comprising a bottom or axle-engaging section consisting of a turning ring and an axle-engaging bar extending diametrically across the ring, a top member comprising a pair of substantially similar pivotally connected sections formed in cross section to receive the ring of the bottom section, means for connecting the free ends of the two sections of the top member together, inwardly-extending oppositely-disposed supporting members carried by said sections, a spring block detachably and fixedly mounted on said supporting members, a cross bar on said block whereby it may be connected with the axle spring, and a brace bar connected at its forward end with said connecting means and at its rear end with the reach pole.

2. A fifth wheel, comprising a bottom or axle-engaging section consisting of an annular ring and a flat axle-engaging bar extending diametrically across the ring and provided at its bottom and on opposite ends with pairs of oppositely disposed depending positioning lugs adapted to engage opposite edges of the axle, means for attaching said bar to the axle, a top member comprising a pair of substantially similar pivotally connected sections suitably formed in cross section to receive the ring of the bottom section, means for connecting the free ends of the bars together, a spring block mounted on the top member, and means for connecting the block with the axle spring.

3. A fifth wheel of the class described, comprising a bottom or axle-engaging section consisting in part of a turning ring, a top member comprising a pair of pivotally connected sections formed in cross section to receive the turning ring of the bottom section and provided with extension bars adapted to register when the two sections of the top member are swung together, a spring block mounted on the extension bars of the top member, means to detachably and fixedly secure the spring block to said bars, means for connecting the block with the axle spring and a brace bar extending between said connecting means and reach pole of the vehicle.

4. A fifth wheel, comprising a bottom section consisting in part of an annular turning ring, a top member comprising a pair of pivotally connected sections suitably formed in cross section to receive the ring of the bottom section, a rivet to pivotally connect the front ends of the two sections of the top member together, said rivet having an oil duct formed therein and communicating with the inner surfaces of said sections, means to connect the free ends of said sections together, extension bars extending from the two sections of the top member inwardly, a spring block mounted on the extension bars, and means for detachably connecting the spring block with said extension bars and with the axle-spring.

In testimony whereof I have hereunto set my hand in presence of two subscribing witnesses.

ROBERT S. SPEER.

Witnesses:
F. L. CLARK,
RANDOLPH H. HARVEY.